(12) United States Patent
Metz

(10) Patent No.: US 6,249,929 B1
(45) Date of Patent: Jun. 26, 2001

(54) WINDSCREEN WIPER ARM

(75) Inventor: Ulrich Metz, Sasbach-Obersasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/380,922

(22) PCT Filed: Nov. 5, 1998

(86) PCT No.: PCT/DE98/03220

§ 371 Date: Sep. 9, 1999

§ 102(e) Date: Sep. 9, 1999

(87) PCT Pub. No.: WO99/37513

PCT Pub. Date: Jul. 29, 1999

(30) Foreign Application Priority Data

Jan. 20, 1998 (DE) ................................ 198 01 944
Apr. 29, 1998 (DE) ................................ 198 19 053

(51) Int. Cl.⁷ .................. B60S 1/32; B60S 1/34
(52) U.S. Cl. .................. 15/250.352; 15/250.351
(58) Field of Search .............. 15/250.351, 250.352, 15/250.34, 250.31, 250.21, 250.23

(56) References Cited

U.S. PATENT DOCUMENTS

| | | | |
|---|---|---|---|
| 3,548,442 | * | 12/1970 | Stratton .................... 15/250.352 |
| 4,050,832 | * | 9/1977 | Stratton et al. ............. 15/250.351 |
| 4,545,088 | * | 10/1985 | Kohler et al. .............. 15/250.351 |

FOREIGN PATENT DOCUMENTS

| | | | |
|---|---|---|---|
| 227619 | * | 4/1959 | (AU) ........................ 15/250.352 |
| 0 770 526 A1 | | 5/1997 | (EP) . |
| 2124714 | * | 9/1972 | (FR) . |
| 636637 | * | 5/1950 | (GB) . |
| 958555 | * | 5/1964 | (GB) . |

* cited by examiner

Primary Examiner—Gary K. Graham
(74) Attorney, Agent, or Firm—Michael J. Striker

(57) ABSTRACT

A windshield wiper arm for windshield wipers in motor vehicles has a fastening part which is connected to a wiper shaft. A joint part connected to a wiper blade is articulated at the fastening part so as to be loaded by a spring. An articulation pin at the point of articulation is located on the side opposite the connection point between the joint part and the wiper blade in respect to a receptacle for the wiper shaft. The application points of the spring between the joint part and the fastening part lie on opposite sides relative to the receptacle of the wiper shaft.

10 Claims, 2 Drawing Sheets

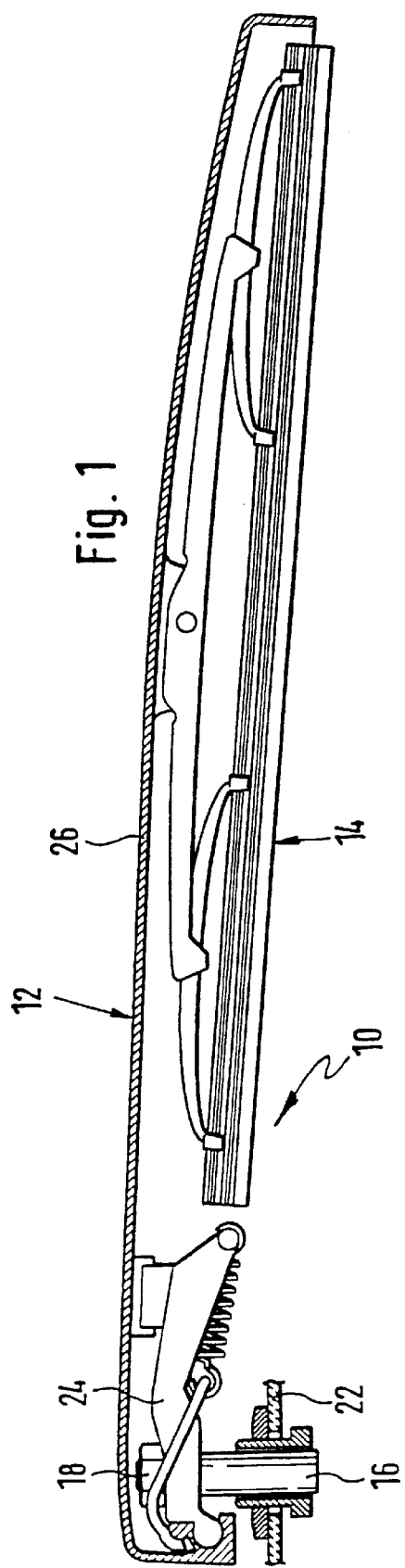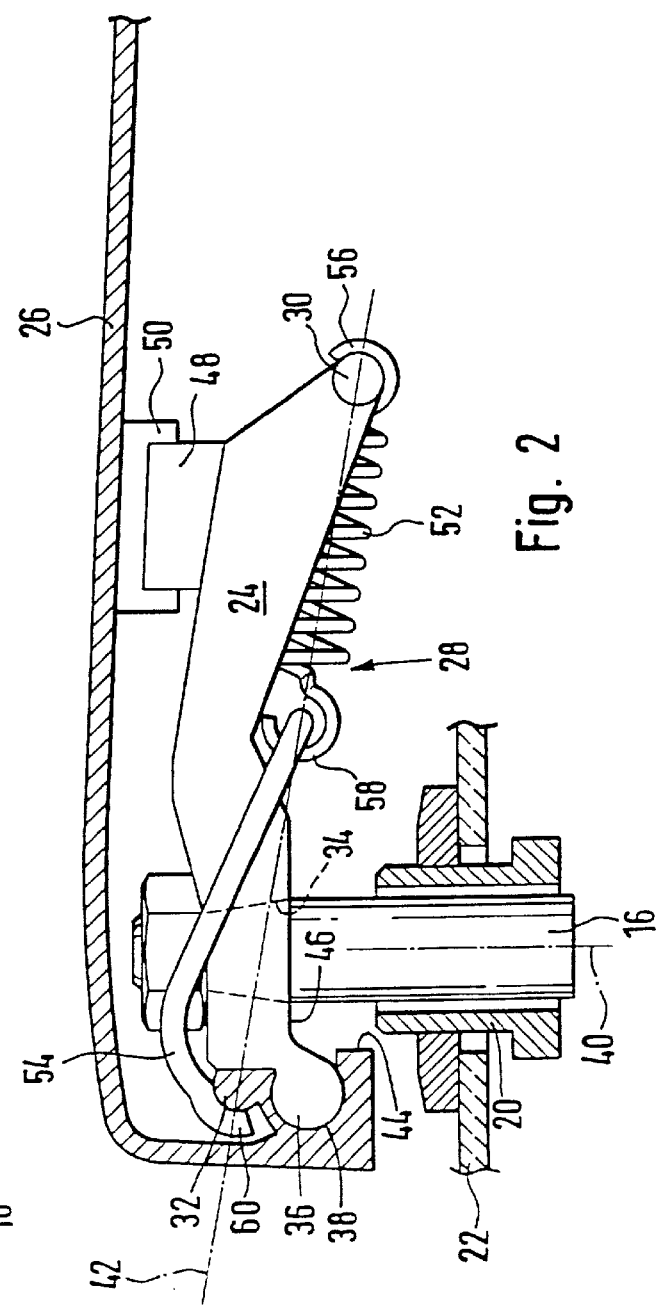

WINDSCREEN WIPER ARM

BACKGROUND OF THE INVENTION

PRIOR ART

The invention is directed to a windshield wiper arm for windshield wipers. Conventional windshield wiper arms substantially comprise a fastening part and a joint part. The fastening part is connected with the wiper shaft so as to be fixed with respect to rotation relative to it and has an articulation pin at which the joint part is articulated. Generally, a wiper blade is fastened to the end of the joint part opposite the pin, likewise so as to be articulated. Between the fastening part and the joint part, there is arranged a spring which, on the one hand, generates the necessary pressing pressure on the wiper blade for proper wiping and, on the other hand, forces the joint part into a stable position in a folded-away position, as it is called, which is necessary for changing the wiper blade. A disadvantage in these constructions consists in that a gap inevitably remains between the fastening part and the joint part, which gap can accumulate dirt and causes wind noises and also detracts from the visual appearance.

EP-OS O 770 526 discloses a wiper arm whose joint part extends over the fastening part and is articulated on the side opposite the wiper blade receptacle with respect to the holding of the wiper shaft at the fastening part. In order to take into account the function of the spring—namely, to generate contact pressing pressure on the one hand and to ensure a stable folded-away position on the other hand—an intermediate part is provided which is articulated in the area of the articulated position known from conventional wiper arms; the spring cooperates with this intermediate part. This intermediate piece transmits the contact pressing pressure generated by the spring to the joint part of the wiper arm via an additional pin and forces the joint part in the folded-away position into the stable position. While this construction eliminates a gap between the fastening part and joint part, its construction is uneconomical and requires more space.

SUMMARY OF THE INVENTION

The windshield wiper arm according to the invention with the features of the main claim has the advantage of a very simple construction with a joint and fastening part and a spring acting between these parts as in conventional wiper arms. However, because of the special arrangement of the joint pin and the contact points or points of application of the spring, a construction is achieved which is free of gaps. Further, it is possible to integrate the fastening part and spring inside the joint part of the wiper arm in a compact and space-saving manner.

The features according to the invention which are indicated in the subclaims make possible advantageous further developments of the windshield wiper arm according to the main claim. The arrangement of the contact point of the spring at the joint part on the side of the articulation pin makes possible a construction which is even more compact because this joint part can pivot very closely about the articulation pin. Therefore, the two end positions loaded by the spring, i.e., the folded-down position and folded-away position, can be achieved very simply.

Additional space is saved in that the application point of the spring at the joint part is located above the articulation pin and the application point of the spring at the fastening part is advantageously located below the articulation pin. The spring accordingly arrives in the area in which there is sufficient space without the need for the joint part to bulge out for this purpose.

Due to the advantageous construction of a stop shoulder and a counter-shoulder at the joint part and fastening part, respectively, a precise folded-away position can be achieved without the need for additional parts.

The pendulum motion during the wiping operation can be transmitted exactly to the longitudinally extending joint part due to guide means which are formed integral with the fastening part. The pin necessary for the folded-away movement is accordingly relieved of the transmission of torque for the pendulum movement.

It is especially advantageous that a tension spring can be used; this tension spring is very simple to produce and, unlike pressure springs, for example, has no need of supporting means. The available space is taken into account in that the spring is advantageously formed of two or more parts and, in particular, comprises a tension spring and a U-shaped spring. In the simplest case, the U-shaped spring is a wire part which tightly engages around the receptacle of the wiper shaft.

BRIEF DESCRIPTION OF THE DRAWINGS

FIG. 1 is a partial cross-sectional view of a windshield wiper arm with a wiper blade according to the present invention;

FIG. 2 is an enlarged partially cross-sectional view of an articulated part of the windshield wiper arm of FIG. 1;

DETAILED DESCRIPTION OF THE PREFERRED EMBODIMENTS

Figure 3:
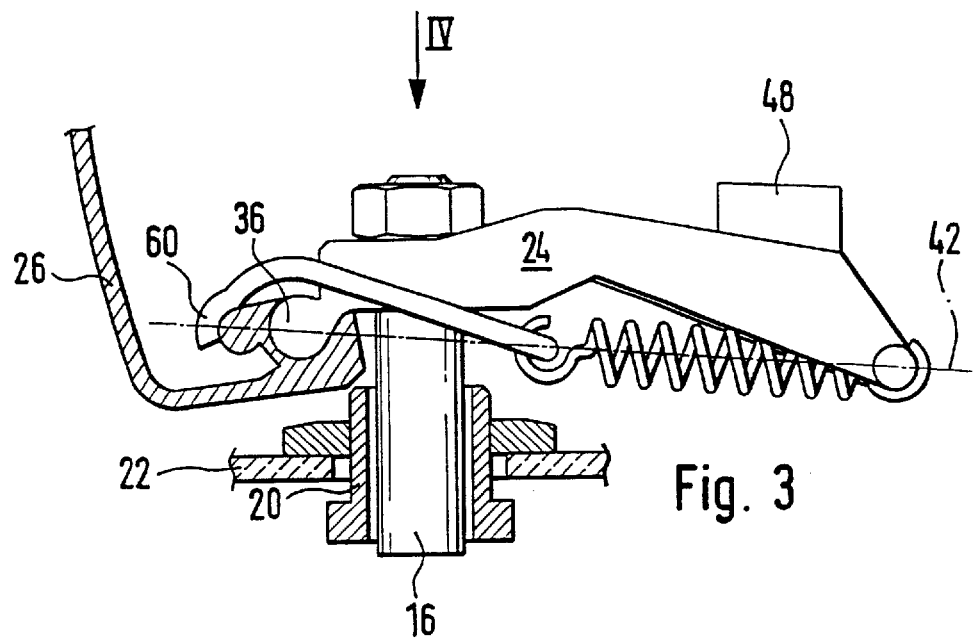
FIG. 3 is a closer, partially cross-sectional view of the articulated part of FIG. 2 shown in a folded-away position.

FIG. 1 shows a windshield wiper 10 with a windshield wiper arm 12 and a wiper blade 14. The windshield wiper arm 12 (hereinafter referred to as wiper arm for the sake of brevity) is connected with a wiper shaft 16 so as to be fixed with respect to rotation relative to it and is secured by a nut 18. The wiper shaft 16 is grasped by a wiper bearing 20 which, in the embodiment example, is guided through a rear windshield 22. As is shown in FIG. 1, the wiper arm 12 is formed of a fastening part 24 and a joint part 26 which extends over the windshield wiper blade on the one hand and the wiper shaft on the other hand.

A spring 28 having one application point 30 at the fastening part 24 and its other application point 32 at the joint part 26 is arranged between the fastening part 24 and the joint part 26. The two application points 30 and 32 are located on opposite sides with reference to the receptacle 34 of the fastening part 24 for the wiper shaft 16. An articulation pin 36 is formed integral with the fastening part 24 which engages over the wiper shaft 16 by the receptacle 34 and is grasped by a cylindrical bearing shell 38 formed integral with the joint part 26. The application point 32 is arranged axially above the articulation pin 36 with reference to the axis 40 of the wiper shaft 16.

The fastening part 24 extends below the joint part 26 proceeding from the receptacle 34 in the direction of the wiper blade 14 and, with its outer end, forms the application point 30 for the spring 28. This application point 30 lies axially below the articulation pin 36 with respect to the axis 40.

When the wiper arm 12 is folded away from the window to be wiped, the application point 32 moves around the articulation pin 36 from above the axis of the articulation pin 36 (FIG. 2) to to the position below the the axis of the articulation pin 36 in the same direction with respect to height as viewed in the direction of the axis 40. Therefore, the working line 42 is also shifted from the position above the axis of the articulation pin 36 to the position below the axis of the articulation pin 36, so that the joint part 26 is drawn into the folded-away position by the spring 28 (see FIGS. 2 and 3).

The exact position of the folded-away position is defined by a stop shoulder 44 which is formed integral with the joint part 26 and which cooperates in the folded-away position with a counter-shoulder 46 formed integral with the fastening part 24.

Guide means in the form of a projecting cam 48 are arranged at the fastening part 24 in the vicinity of the application point 30 and are grasped in the wiping position by a guide receptacle 50 formed integral with the joint part 26. When the pendulum movement is transmitted proceeding from the wiper shaft 16 via the fastening part 24, the torque is therefore transmitted via the joint shaft 16 and via the cam 48 to the guide receptacle 50 and, accordingly, to the joint part 26. The articulation pin 36 provided for the folded-away movement is extensively relieved from the transmission of torque.

Figure 4:
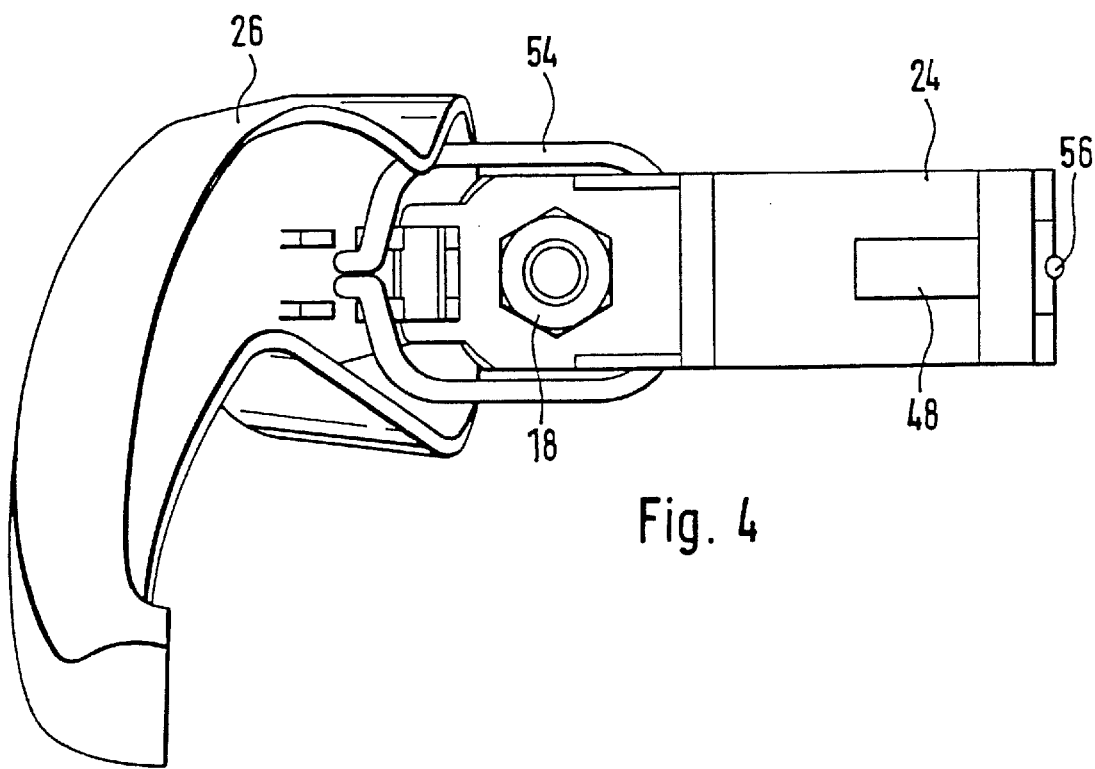
FIG. 4 is a view seen from arrow IV of FIG. 3.

In the embodiment example, the spring 28 is constructed so as to have several parts—in this case, two parts—and comprises a spiral-shaped tension spring 52 and a U-shaped spring 54 formed from bent wire. The tension spring 52 is fitted with a hook 56 at the application point 30 on one side and in another hook 58 at the U-shaped spring 54. On the side opposite from the hook 58, the U-shaped spring 54 engages around the application point 32 by a hook-shaped continuation 60. FIG. 4 shows how the U-shaped spring 54 is bent around the area of the receptacle 34 and is guided relative to the application point 32.

There are also other possible embodiment forms of the spring 28. For instance, the U-shaped spring 54 can be formed so as to be directly integral with the tension spring 52 or, given an appropriate selection of application points, the U-shaped spring 54 and tension spring 52 can also be exchanged for one another.

What is claimed is:

1. Windshield wiper arm for windshield wipers in motor vehicles, comprising a fastening part (24) connectable to a wiper shaft (16), a joint part (26) connectable to a wiper blade (14) and which is articulated at the fastening part(24) via an articulation pin (36) for rotation about an axis, a spring (28) between the two parts loads said joint part about said axis, the articulation pin (36) being located on the side opposite a connection point between the joint part (26) and the wiper blade (14) with reference to a receptacle (34) in said fastening part for the wiper shaft (16), wherein points of application (30,32) of the spring (28) between the joint part (26) and the fastening part (24) lie on opposite sides with respect to the receptacle (34) of the wiper shaft (16), wherein the point of application (32) of the spring (28) is located at the joint part (26) on the side of the articulation pin (36) and moves from a position above an axis of the articulation pin (36) to a position below the axis of the articulation pin (36) during a folding-away movement of the windshield wiper arm (12).

2. Windshield wiper arm according to claim 1, wherein the point of application point (32) of the spring (28) at the joint part (26) is located above the axis of the articulation pin (36) with reference to the axis (40) of the wiper shaft (16) in a folded-down position of the windshield arm.

3. Windshield wiper arm according to claim 1, wherein the point of application (30) of the spring (28) at the fastening part (24) is located below the axis of the articulation pin (36) with reference to the axis (40) of the wiper shaft (16) to be received.

4. Windshield wiper arm according to claim 1, wherein a stop shoulder (44) is formed at the joint part (26) on the side opposite the point of application (32) of the spring (28) at the joint part (26) with reference to the articulation pin (36), said stop shoulder (44) contacting a counter-shoulder (46) formed at the fastening part (24) in a folded-away position of the windshield wiper arm (12).

5. Windshield wiper arm according to claim 1, wherein guide means (48) for the joint part (26) are arranged at the fastening part (24).

6. Windshield wiper arm according to claim 5, wherein the guide means (48) are arranged on the side of the point of application (30) of the spring (28) at the fastening part (24) with reference to the receptacle (34) for the wiper shaft (16).

7. Windshield wiper arm according to claim 1, wherein the spring (28) is a tension spring (52).

8. Windshield wiper arm according to claim 1, wherein the spring (28) has at least two parts.

9. Windshield wiper arm according to claim 1, wherein the spring comprises at least a tension spring (52) and a U-shaped spring (54).

10. Windshield wiper arm according to claim 9, wherein the U-shaped spring (54) engages around the receptacle (34) for the wiper shaft (16).

* * * * *